C. MERCER.
WIRE FENCE TIE.
APPLICATION FILED OCT. 20, 1909.
979,683.
Patented Dec. 27, 1910.
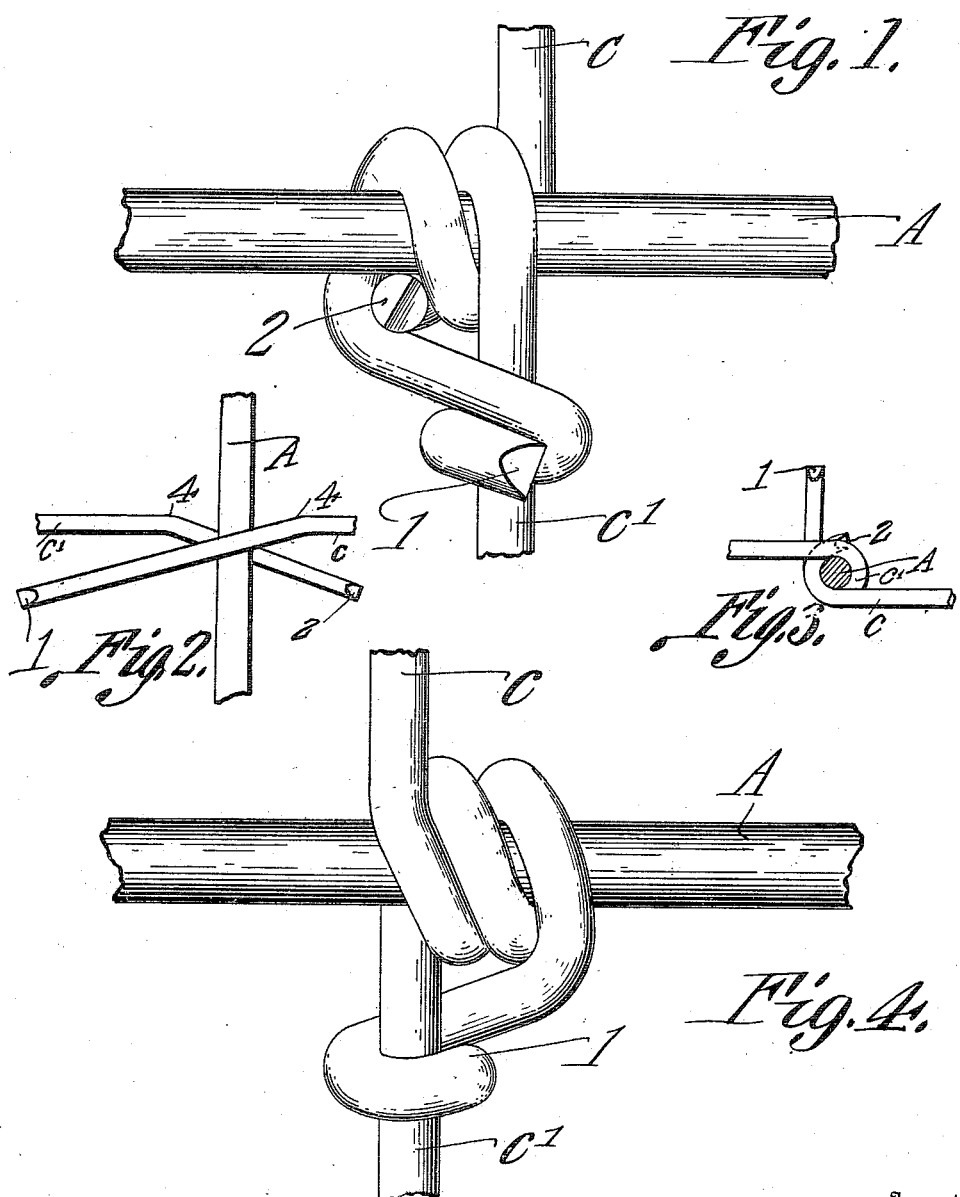

UNITED STATES PATENT OFFICE.

CHARLES MERCER, OF TUSCOLA, ILLINOIS, ASSIGNOR TO NATIONAL FENCE & GATE CO., OF TUSCOLA, ILLINOIS.

WIRE-FENCE TIE.

979,683.  Specification of Letters Patent.  Patented Dec. 27, 1910.

Application filed October 20, 1909. Serial No. 523,635.

*To all whom it may concern:*

Be it known that I, CHARLES MERCER, a citizen of the United States, residing at Tuscola, in the county of Douglas and State of Illinois, have invented a new and useful Wire-Fence Tie, of which the following is a specification.

This invention has reference to an improved tie or interlocking joint for the contiguous ends of vertical wires of woven fences, said wires being adapted to connect and act as stays for the line or horizontal wires of such fences.

The objects of my invention are to interlock the contiguous ends of these wires in such a manner that they are held firmly and securely against all disconnection and also to form a wrap and rigid stay wire for the horizontal line wire for fences of this type, each wire forming an individual grip.

A further object of this invention is to provide a tie arm, the ends thereof, when the same is completed, resting entirely on the exterior side of the fence thus eliminating all damage likely to be inflicted on animals retained by the traps when they come in contact with the same.

With the above and other ends in view the invention consists in the construction, combination and arrangement of parts all as hereinafter more fully described, specifically claimed and illustrated in the accompanying drawings, wherein,—

Figure 1 is an elevation of one side of the complete tie. Fig. 2 shows the relative positions of the wires subsequent to the first step. Fig. 3 is a plan view of the tie and showing the relative positions of the parts prior to the last step. Fig. 4 is a view similar to Fig. 1 looking at the opposite side of the completed tie.

Referring to the figures by characters of reference, A designates one of the horizontal or line wires of a fence and C and C′ designate vertical stay wires. The two stay wires are designed to extend in opposite directions from the line wire.

In forming the tie, the stay wires C and C′ are placed upon opposite sides of the line wire A and substantially parallel with each other, the terminal of the wire C projecting a much greater distance past the line wire A than does the terminal of the wire C′. These terminals have been designated by the numerals 1 and 2 respectively. After the wires have been placed in the relative positions described the terminal portions thereof are bent at 4 so as to extend diagonally across the line wire A. This position of the parts has been indicated in Fig. 2. The ends 1 and 2 of the stay wires are then engaged by separate dogs of a twisting machine and simultaneously twisted or coiled about the line wire A until the short end 2 of the stay wire C′ lies close to the line wire A as shown in Fig. 3 while the terminal wire of the stay wire C extends perpendicularly to the wire C′ as shown in said Fig. 3 where it is ready for the last operation of coiling said end 1 about the wire C′.

It will be understood from the foregoing that a tie formed in the manner herein described will firmly grip the line or horizontal wire A. It will further be noticed that the extremities of the wire both rest on one side of the tie, and thus, in constructing the same, should this side of the tie be outside an inclosure, the said ends will not injure animals retained by the fence.

Having thus fully described my invention what I claim as new and desire to secure by U. S. Letters Patent is;—

1. A fence tie comprising a line wire and first and second oppositely extending stay wires fitted against opposite sides of the line wire and having their terminals coiled around the line wire in parallelism with each other, the terminals of the first wire at the end of the parallel coils being bent sharply across the terminal of the second stay wire so as to grip said terminal of the second wire in the space between the coils of the first wire, the extreme end of said first wire being then directed toward and coiled around said second stay wire at a point thereon removed from the line wire.

2. A fence tie comprising a line wire and first and second oppositely extending stay wires fitted against opposite sides of the line wire and having their terminals coiled around the line wire in parallelism with each other, the terminal of the first stay wire at the end of the parallel coil being bent sharply across the terminal of the second stay wire so as to grip said terminal in the space between the coils of the first wire, the extreme end of said first wire being then extended to and coiled around said second stay wire, the ends of both of said wires being directed in the same direction and on the same side of the fence.

In testimony that I claim the foregoing as my own, I have hereto affixed my signature in the presence of two witnesses.

CHARLES MERCER.

Witnesses:
    Tom Abrams,
    John C. Kahn.